United States Patent [19]

Panella

[11] 3,946,607

[45] Mar. 30, 1976

[54] APPARATUS FOR MEASURING CHAMBER PRESSURE

[75] Inventor: Edward A. Panella, Ridgecrest, Calif.

[73] Assignee: The United States of America as represented by the Secretary of the Navy, Washington, D.C.

[22] Filed: July 25, 1975

[21] Appl. No.: 599,292

[52] U.S. Cl. .......................... 73/167; 73/35; 73/406
[51] Int. Cl.² ........................................... G01L 5/14
[58] Field of Search ............ 73/35, 406, 167, 398 R; 325/115, 113

[56] References Cited
UNITED STATES PATENTS
3,392,524   7/1968   Caveny ................................. 73/35

Primary Examiner—Donald O. Woodiel
Attorney, Agent, or Firm—R. S. Sciascia; Roy Miller

[57] ABSTRACT

A combustion chamber pressure measuring apparatus comprising a diaphragm and pressure bulkhead assembly, pressure transmitting fluid, pressure transducer, and a telemetry section is disclosed for an end burning grain solid propellant rocket. This apparatus eliminates the need for external attachments to the rocket or modifications to the propellant grain and enables fail-safe testing of previously manufactured rockets under actual flight conditions.

5 Claims, 3 Drawing Figures

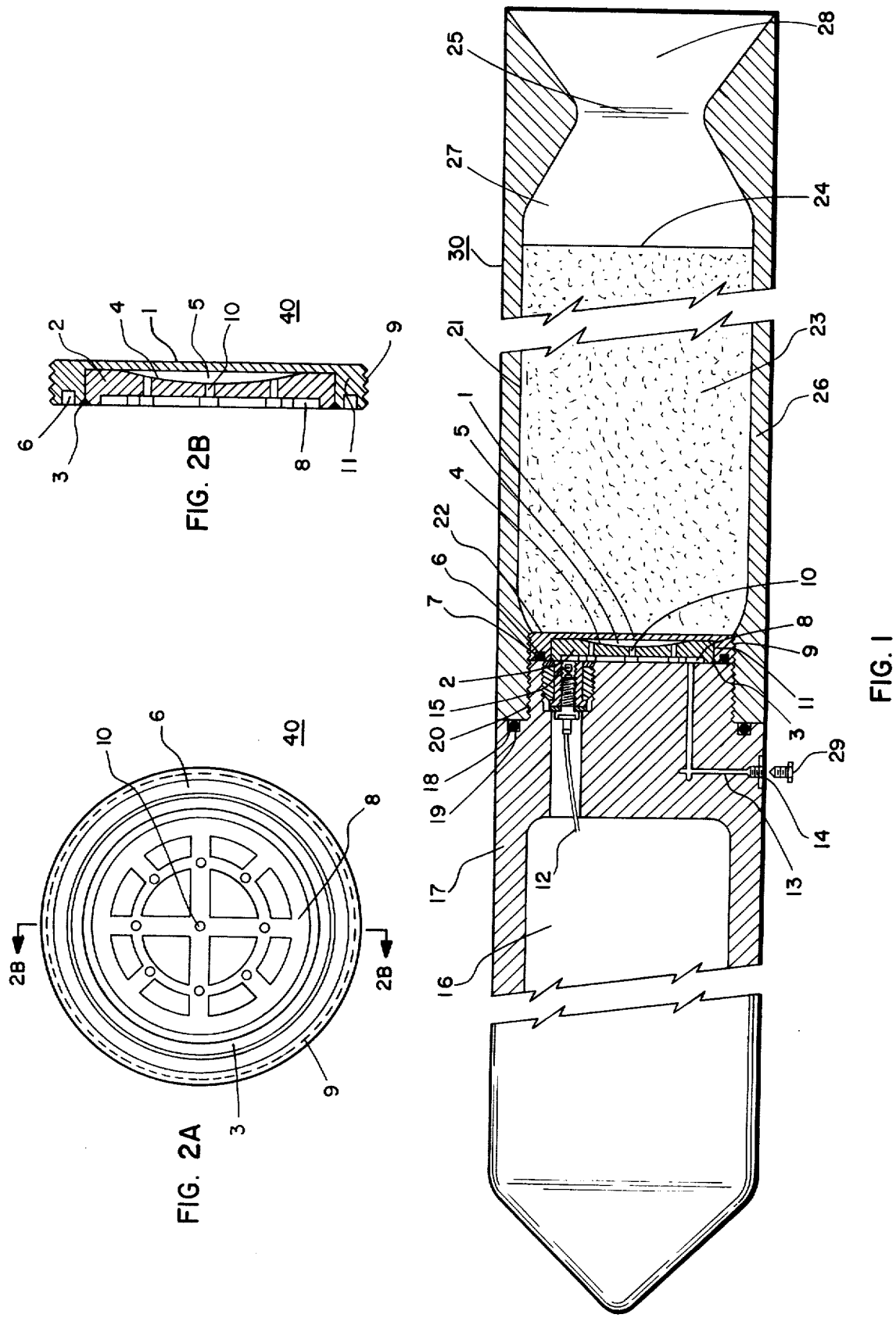

APPARATUS FOR MEASURING CHAMBER PRESSURE

BACKGROUND OF THE INVENTION

This invention relates to apparatus for measuring combustion chamber pressure in an end burning grain solid propellant rocket, and more particularly to apparatus suitable for making such measurements under actual flight conditions.

It has been usual to measure rocket combustion chamber pressure in static rocket firings by tapping the combustion chamber pressure at the rocket nozzle plate using apparatus mounted external to the rocket. This method is not practical when testing a rocket which must be launched from a gun bore or tested under actual flight conditions.

Any apparatus external to the rocket would interfere with the gun barrel or with the rocket flight characteristics and would be difficult to retain to the exterior of an accelerating rocket. Other methods used to measure combustion chamber pressure have involved casting pressure pickup tubes into the propellant grain during manufacture, thereby allowing the pressure sensing equipment to be carried inside the rocket. This method, however, does not permit testing rockets which have been previously manufactured without specially molded in pressure sensing tubes. Adding pressure sensing tubes to all rocket propellant grains is not desirable because doing so increases the chance of rocket malfunction. The tube-grain interface could become the source of grain unbonds, resulting in improper grain burning and rocket motor catastrophic failure. Also, integral pressure tubes displace propellant volume, reducing range or thrust.

SUMMARY OF THE INVENTION

The present invention is mounted within a rocket, but does not interfere with the propellant grain. A diaphragm contacts the inhibitive coating on the forward end of the propellant grain and transmits the force of propellant grain end thrust to a confined hydraulic fluid. A remotely located pressure transducer senses pressure within the hydraulic fluid and produces an electric signal which is transmitted to ground equipment through telemetry equipment carried on board the rocket. The diaphragm is protected from excessive deflection and rupture by a thick pressure bulkhead.

The diaphragm and associated parts may be installed in a rocket in place of the warhead without modification to the rocket motor thereby enabling fail-safe testing of previously manufactured rockets under actual flight conditions.

BRIEF DESCRIPTION OF THE DRAWING

FIG. 1 is a longitudinal section view of an embodiment of the invention mounted in a rocket.

FIG. 2A is a frontal view of the diaphragm and pressure bulkhead assembly according to the invention; and FIG. 2B is a crosssectional view of the assembly of FIG. 2A along section line 2B.

DETAILED DESCRIPTION OF AN EMBODIMENT

Referring now to the drawings wherein like reference numerals refer to like features throughout the several figures there appears in FIG. 1 a solid fuel powered rocket 30. Rocket 30 is made up of front section 17 and rear section 26 which are threaded together by means of mating threads 20, and sealed by O-ring 18 in groove 19. Rear section 26 contains end burning solid propellant grain 23 which burns from end 24 when ignited. Grain 23 is separated from the walls of rear section 26 by inhibitive coating at 21 which prevents local burning on the side of grain 23. Similarly, inhibitive coating at 22 prevents burning on the forward end of grain 23. When grain 23 is ignited, combustion takes place and hot gases form in combustion chamber 27. These gases flow through throat 25 and out nozzle 28 producing thrust.

As pressure in chamber 27 increases, the remaining portion of solid propellant grain 23 not yet burned is pressed forward against inhibitive coating 22 and the rear side of diaphragm 1 by the expanding gases. As the chamber pressure continues to increase, diaphragm 1 deflects forward a small distance and pressurizes fluid 5 which is confined in the passages forward of diaphragm 1. Fluid 5 is almost incompressible and may be a hydraulic fluid of the nonflammable type commonly used in aircraft hydraulic systems. Fluid 5 is confined within rocket 30 at nearly constant volume and is ducted to pressure sensing means 15 which produces a proportional electric signal in response to the hydrostatic pressure of fluid 5. This electric signal is sent by wires 12 to radio telemetry equipment not shown, occupying space 16 in front section 17 for transmission to ground equipment, also not shown, capable of displaying and recording the signal in units of combustion chamber pressure.

Diaphragm 1 is the thin central area of a circular disk made by forming a concentric circular cylindrical cavity in one side of a thick disk, leaving a thick ring 11 about the periphery of the disk. Threads 9 which mate with threads 20 on rear section 26 are formed on the outer edge of ring 11. A groove 6 and o-ring 7 in ring 11 seal against forward section 17 to prevent leakage of fluid 5.

Thick pressure bulkhead 2 fits within ring 11 and is fastened in place by suitable fastening means. Bulkhead 2 may be welded to ring 11 by fillet weld 3. If welded, weld 3 must be ground level with the front side of ring 11. At least one hole 10 penetrates bulkhead 2 to allow fluid 5 to transmit pressure past bulkhead 2. A pattern of shallow grooves 8 intersect with holes 10 to provide rapid pressure response through and across the front surface of bulkhead 2.

The rear surface of bulkhead 2 has contour 4 shaped to support diaphragm 1 against deflection beyond the elastic limit of the diaphragm material. As combustion chamber pressure causes diaphragm 1 to deflect toward bulkhead 2, diaphragm 1 assumes a contour approximately matching its elastic curve. As deflection continues, the center of diaphragm 1 becomes more heavily loaded and the shape of diaphragm 1 begins to deviate from its elastic curve. Just as the stress in diaphragm 1 approaches the yield point, diaphragm 1 contacts bulkhead 2 and is prevented from further deflection. The exact shape of contour 4 required will depend upon the strength and elasticity of the material selected for diaphragm 1.

Generally speaking, contour 4 is a compound surface having a concave depression in the central portion blending to a convex toroidal surface at an inflection a preselected radial distance from the center. This toroidal surface blends near the outer periphery of bulkhead 2 to a plane surface which contacts the outer periphery of diaphragm 1 at the inner radius of ring 11. For a given diaphragm an acceptable contour 4 may be calculated using known material properties and diaphragm dimensions in well known formulas for stress and deflection of diaphragms.

Normally, confined fluid 5, being almost incompressible, will support diaphragm 1 against deflection past a small initial deflection. If fluid 5 contains an amount of compressible fluid such as air, then as combustion chamber pressure increases fluid 5 will compress the air and permit further diaphragm deflection. Similarly if fluid 5 finds a leak path, diaphragm 1 will deflect as supporting fluid 5 is forced from its confined volume. By designing contour 4 to allow diaphragm 1 to deflect until it reaches the elastic limit, a maximum tolerance to fluid 5 leakage or gas entrapment is provided before the pressure measuring function is lost without jeopardizing rocket 30. If diaphragm 1 were to deflect past the elastic limit and rupture, it is likely that a sharp edge would break inhibitive coating at 22 on the front end of propellant grain 23. If this occurs, grain 23 would begin local burning where coating at 22 is broken. This would cause grain 23 to be forced by gases forming in front of grain 23 into throat 25 decreasing the flow of exhaust gas through nozzle 28 and greatly reducing thrust. Further burning on the front of grain 23 would cause combustion chamber pressure to increase until rear section 26 ruptures and rocket 30 is destroyed.

When rocket 30 is assembled, compressible fluids are evacuated from the forward side of diaphragm 1, pressure sensing means 15, and connecting passages by attaching a vacuum pump, not shown, to port 14 and drawing the fluids out through passageway 13. When these spaces are substantially free of compressible fluid such as air, an almost incompressible fluid such as non flammable hydraulic fluid 5, is drawn inside by the pressure difference existing between the low vacuum and atmospheric pressure, and completely fills these spaces. Finally a plug 29 is installed in port 14 to prevent escape of hydraulic fluid 5.

In actual use the warhead or forward section of a rocket, not shown, is unthreaded from rear section 26, and diaphragm and bulkhead assembly 40 threaded tightly into rear section 26. Front section 17 containing telemetry equipment and pressure responsive means 15 is then threaded into rear section 26 and retained in place by screw threads 20. All fluid passages are evacuated and filled with hydraulic fluid 5 and plug 29 is tightened to seal fluid 5 against leakage. Rocket 30 is then ready to be tested under actual launch and flight conditions.

It is to be understood that although stainless steel was used for diaphragm 1 and bulkhead 2 when this invention was reduced to practice, other metallic materials would work equally well. Also, the pattern of holes 10 and shallow grooves 8 shown in FIG. 2A is illustrative only and could be redesigned in many ways to achieve the same result without making a significant departure from the spirit of the invention. Pressure responsive means 15 could be a piezoelectric pressure transducer or any other device capable of translating hydrostatic fluid pressure into an electric signal.

What is claimed is:

1. Apparatus for measuring combustion chamber pressure in an end burning grain solid propellant rocket, comprising in combination:

a disk having first and second sides, thickness, a circumferential edge, screw threads on said circumferential edge, and a concentric right circular cylindrical cavity in said first side smaller in diameter than said disk and penetrating said disk a distance less than said thickness, forming a thin circular diaphragm in the central area of said disk and leaving a thick ring at the periphery, securely mounted in said rocket and said second side held in contact with the inhibitive coating on said propellant grain by said screw threads engaging matching screw threads in said rocket, a cylinder having a diameter and length matching said diameter and depth of said cylindrical cavity, first and second ends, at least one hole penetrating said cylinder through both said ends, at least one surface groove on said first end intersecting said hole, and a compound surface contour on said second end described by a centrally located concave depression blending at a preselected radial distance to a convex toroidal surface and further blending to a plane surface near the periphery of said second end, said cylinder placed concentrically within said cylindrical cavity, said second end facing said diaphragm, fixedly secured to said disk, fluid pressure responsive means for sensing hydrostatic pressure in a fluid and producing a proportional electric signal in response to said pressure, securely mounted in said rocket, a fluid pressure transmitting conduit for confining fluid and transmitting fluid pressure extending from the region adjacent to said diaphragm first side to said fluid pressure responsive means, a fluid occupying said conduit and regions adjacent to said fluid pressure responsive means and said diaphragm first side, telemetry apparatus having radio transmission means, demountably connected to said rocket and communicating electrically with said pressure responsive means, for transmitting combustion chamber pressure in the form of fluid pressure to pressure responsive means for conversion to an electric signal for further transmission to a remote suitably calibrated device for display in units of combustion chamber pressure.

2. The combination of claim 1 wherein said fluid pressure responsive means comprises a piezoelectric pressure transducer.

3. The combination of claim 1 wherein said cylinder and disk are metallic and said cylinder has a contour on said second end shaped to support said diaphragm against further deflection when the stress in the diaphragm from deflection reaches the level at which plastic yielding occurs.

4. The combination of claim 1 wherein said fluid is a nonflammable hydraulic fluid.

5. A disk and cylinder assembly for use with nonflammable hydraulic fluid, a piezoelectric pressure transducer, and telemetry apparatus having radio transmission means in measuring combustion chamber pressure in an end burning grain solid propellant rocket under actual launch and flight conditions, comprising:

a disk having first and second sides, thickness, a circumferential edge, and a concentric right circular cylindrical cavity in said first side and penetrating said disk a distance less than said thickness, forming a thin circular diaphragm in the central area of said disk and leaving a thick ring at the periphery of said disk, and;

a cylinder having a diameter and length matching said diameter and depth of said cylindrical cavity, first and second ends, at least one hole penetrating said cylinder through both said ends, at least one surface groove on said first end intersecting said hole, and a compound surface contour on said second end described by a centrally located concave depression blending at a preselected radial distance to a convex toroidal surface and further blending to a plane surface near the periphery of said second end, shaped to support said diaphragm against further deflection when the stress in the diaphragm from deflection reaches the point at which plastic yielding occurs, said cylinder placed concentrically within said cylindrical cavity, said second end facing said diaphragm, fixedly secured to said disk.

* * * * *